(12) United States Patent
Emanet et al.

(10) Patent No.: US 12,184,230 B2
(45) Date of Patent: Dec. 31, 2024

(54) SOLAR POWER GENERATION SYSTEM

(71) Applicant: OMRON Corporation, Kyoto (JP)

(72) Inventors: Nahit Emanet, East Greenwich, RI (US); Oezguer Aksoy, East Greenwich, RI (US); Mustafa Mihmanli, East Greenwich, RI (US); Takahiro Takeyama, Kyoto (JP); Ryo Ogura, Kyoto (JP); Jeongho Baik, Kyoto (JP); Jun Nakaichi, Kyoto (JP); Tsuyoshi Uchida, Hoffman Estates, IL (US); Tomoko Endo, Hoffman Estates, IL (US); Erica Martin, Hoffman Estates, IL (US)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 18/218,585

(22) Filed: Jul. 6, 2023

(65) Prior Publication Data
US 2024/0039469 A1 Feb. 1, 2024

(30) Foreign Application Priority Data
Jul. 29, 2022 (JP) .................. 2022-121829

(51) Int. Cl.
*H02S 40/36* (2014.01)
*H02H 7/20* (2006.01)
*H02S 40/32* (2014.01)

(52) U.S. Cl.
CPC .............. *H02S 40/36* (2014.12); *H02H 7/20* (2013.01); *H02S 40/32* (2014.12)

(58) Field of Classification Search
CPC ....... H02J 2300/22; H02J 3/381; H02S 40/30; H02S 40/32; H02S 40/36; H02S 50/00
See application file for complete search history.

(56) References Cited

FOREIGN PATENT DOCUMENTS

| JP | 2012-511299 A | | 5/2012 | |
| JP | 2016-135016 A | * | 7/2016 | ............. Y02E 10/50 |
| WO | 2010/065043 A1 | | 6/2010 | |

OTHER PUBLICATIONS

JP 2016-135016 A machine translation as provided by FIT database, translated on Jun. 15, 2024.*

* cited by examiner

*Primary Examiner* — Golam Mowla
(74) *Attorney, Agent, or Firm* — SHINJYU GLOBAL IP

(57) ABSTRACT

The solar power generation system includes a string, an inverter, and primary and secondary shut-off devices. The primary shut-off device cuts off the string and the inverter in response to a first control signal. The secondary shut-off device cuts off a solar cell module group and another solar cell module or the inverter in response to a second control signal from the primary shut-off device. The secondary shut-off device includes a first secondary-device open-close unit in a first electric pathway, a semiconductor switching device disposed between the first secondary-device open-close unit and a solar cell module group, and a power supply unit having an anode-side terminal connected between a solar cell module group and the semiconductor switching device, which generates power to drive the third open-close unit. The semiconductor switching device enters an OFF state when power generated by the solar cell module groups falls below a predetermined threshold.

15 Claims, 8 Drawing Sheets

| OPERATION MODE | WEATHER SUNLIGHT | POWER GENERATION | FIRST CONTROL SIGNAL | RELAY OPERATION MODE |
|---|---|---|---|---|
| START | ☀ | YES | NO | ON |
| ACTIVE | ☀ | YES | NO | ON |
| SAFETY NORMAL CUT-OFF | ☾🌧 | NO | YES | OFF |
| | ⛅ | UNSTABLE | NO | ON |
| EMERGENCY SAFETY CUT-OFF | ☀ | YES | YES | OFF |

FIG. 5

| OPERATION MODE | | WEATHER SUNLIGHT | POWER GENERATION | SECOND CONTROL SIGNAL | RELAY OPERATION MODE | SEMICONDUCTOR SWITCH OPERATION MODE |
|---|---|---|---|---|---|---|
| START | | ☀ | YES | NO | ON | ON |
| ACTIVE | | ☀ | YES | NO | ON | ON |
| SAFETY | NORMAL CUT-OFF | 🌙🌧 | NO | YES | OFF | OFF |
| | | ⛅ | UNSTABLE | NO | ON/OFF | OFF |
| EMERGENCY SAFETY CUT-OFF | | ☀ | YES | YES | OFF | OFF |

FIG. 6

SOLAR POWER GENERATION SYSTEM

CROSS-REFERENCES TO RELATED APPLICATIONS

This application claims priority under 35 U.S.C. § 119 to Japanese Patent Application No. 2022-121829 filed on Jul. 29, 2022. The entire disclosure of Japanese Patent Application No. 2022-121829 is incorporated herein by reference.

FIELD

The present invention relates to a solar power generation system.

BACKGROUND

To protect firefighters from electrical shock in an emergency such as a fire, some solar power generation systems have a function that immediately stops power generation during an emergency (for example, see Published Japanese Translation No. 2012-511299 of the PCT International Publication). The function is called rapid shutdown function. The rapid shutdown function is conducted by a shut-off device configured to cut off the electric path in the solar power generation system in response to a control signal that is generated in an emergency.

SUMMARY

In a shut-off device of a solar power generation system, a switching device configured to open and close a mechanical contact such as a relay is used as a switching device that cuts off the electric path in the solar power generation system. The power to drive the switching device is supplied from solar cell modules of the solar power generation system. That is, the power generated by the solar cell modules is used to drive an external device (e.g., an inverter) and to drive the switching device. In this case, when the amount of power generated by the solar cell modules decreases excessively for some reason to supply the power to the switching device to drive it, for example, a phenomenon may occur that a contact of the switching device is repeatedly opened (the switching device enters an OFF state) even if an attempt is made to close the contact with the power from the solar cell modules (to bring the switching device into an ON state). Further, when the amount of power generated by the solar cell modules becomes unstable, the switching device may be repeatedly switched between the ON state and the OFF state. The occurrence of this phenomenon makes the operation of the solar power generation system unstable, for example, hindering the activation of the solar power generation system.

An object of the present invention is to improve the operational stability of a solar power generation system.

A solar power generation system in accordance with the claimed invention includes a string, an inverter, a primary shut-off device, and a secondary, "downstream" shut-off device. The string includes a plurality of solar cell modules connected in series with each other. The inverter is connected to the string and configured to convert DC power output from the solar cell modules to AC power. The primary shut-off device is disposed between the string and the inverter and is configured to cut off (i.e., disconnect from each other) the string and the inverter in response to a control signal from the inverter. The secondary shut-off device is connected to an electric path connecting a solar cell module group and either another solar cell module group or the inverter. The solar cell module group includes one or more of the plurality of series solar cell modules in the string. The secondary shut-off device cuts off the solar cell module group and another solar cell module group or the inverter in response to a second control signal from the primary shut-off device.

In the solar power generation system, the secondary shut-off device includes a first secondary-device open-close unit, a semiconductor switching device, and a power supply unit. The first secondary-device open-close unit is disposed in a first electric pathway that extends through the secondary shut-off device. The first electric path is an electric path connecting an anode-side terminal of the associated solar cell module group and either the other solar cell module group or the inverter. The semiconductor switching device is disposed between the first secondary-device open-close unit in the first electric path and the anode-side terminal of the solar cell module group. The power supply unit generates power to drive the first secondary-device open-close unit. The power supply unit has an anode-side terminal connected between the anode-side terminal of the associated solar cell module group in the first electric path and the semiconductor switching device. The cathode-side terminal is connected to a cathode-side terminal of the associated solar cell module group. The semiconductor switching device is configured to enter an OFF state when an amount of power generated by the associated solar cell module group falls below a predetermined threshold.

In the solar power generation system, the semiconductor switching device of the secondary shut-off device enters an OFF state when the amount of power generated by the solar cell module group connected to the secondary shut-off device falls below a predetermined threshold. With this configuration, when the amount of power generated by a solar cell module group is small, the electric path from the solar cell module group to the inverter is cut off, so that the solar cell module group can supply the power only to the power supply unit. That is, when the amount of power generated by a solar cell module group is small, the power generated by the solar cell module group is used only to drive the third open-close unit. Supplying the power from the solar cell module group only to the first secondary-device open-close unit allows the first secondary-device open-close unit to be maintained in a closed state (ON state) even if the amount of power generated by the solar cell module group is small or unstable. As a result, the solar power generation system operates stably.

The secondary shut-off device may include a bypass device. The bypass device is connected to a second electric pathway that extends through the secondary shut-off device at one end and is connected at the other end between the first secondary-device open-close unit in the first electric pathway and the semiconductor switching device. The second electric pathway is an electric path connecting the cathode-side terminal of an associated solar cell module group and either another solar cell module group or the inverter. In this case, even if the amount of power generated by a specific solar cell module group decreases, the power generated by another solar cell module group can be transferred to the inverter via the bypass device.

The semiconductor switching device may be a MOSFET device or an IGBT device. These devices can reduce the power required to turn the semiconductor switching device into an ON state or an OFF state.

The secondary shut-off device may include a second secondary-device open-close unit connected to the second electric pathway. In this case, in the secondary shut-off device, it is possible to cut off both the electric pathway connecting the anode-side terminal of the associated solar cell module group and one other solar cell module group or the inverter (hereinafter referred to as "another device"), and the electric path connecting the cathode-side terminal of the associated solar cell module group and yet another other device. As a result, the safety of the solar power generation system in an emergency can be improved.

The first secondary-device open-close unit and the second secondary-device open-close unit may be openable and closable simultaneously. In this case, it is possible to simultaneously cut off both 1) the electric pathway connecting the anode-side terminal of the associated solar cell module group and another device, and 2) the electric pathway connecting the cathode-side terminal of the associated solar cell module group and yet another device in response to the second control signal.

The first secondary-device open-close unit and the second secondary-device open-close unit may be openable and closable independently of each other. In this case, the number of combinations can be increased for cutting off 1) the electric pathway connecting the anode side terminal of the associated solar cell module group and another device, and 2) the electric pathway connecting the cathode side terminal of the associated solar cell module group and yet another device in response to the second control signal.

The primary shut-off device may include a first primary-device open-close unit connected to an anode-side terminal of the string and an anode-side terminal of the inverter. In this case, the string and the inverter can be reliably cut off.

The primary shut-off device may include a second primary open-close unit connected to a cathode-side terminal of the string and a cathode-side terminal of the inverter. In this case, in the primary shut-off device, it is possible to cut off both 1) the electric path connecting the anode-side terminal of the string and the anode-side terminal of the inverter, and 2) the electric path connecting the cathode-side terminal of the string and the cathode-side terminal of the inverter. As a result, the safety of the solar power generation system in an emergency can be improved.

The first primary open-close unit and the second primary open-close unit may be openable and closable simultaneously. In this case, it is possible to cut off simultaneously both 1) the electric path connecting the anode-side terminal of the string and the anode-side terminal of the inverter, and 2) the electric path connecting the cathode-side terminal of the string and the cathode-side terminal of the inverter in response to the first control signal.

The first primary open-close unit and the second primary open-close unit may be openable and closable independently of each other. In this case, the number of combinations can be increased for cutting off 1) the electric path connecting the anode-side terminal of the string and the anode-side terminal of the inverter and 2) the electric path connecting the cathode-side terminal of the string and the cathode-side terminal of the inverter, in response to the first control signal.

The primary shut-off device may be driven by power supplied from a commercial power supply. In this case, the primary shut-off device is operable regardless of whether or not power is supplied from the string. As a result, the string and the inverter can be reliably cut off in an emergency, improving the safety of the solar power generation system in an emergency.

The inverter may output the first control signal to the primary shut-off device by power line communication. In this case, no separate line is required for communication between the inverter and the primary shut-off device.

The inverter may output the first control signal to the primary shut-off device by wireless communication. In this case, no communication line is required between the inverter and the primary shut-off device.

The primary shut-off device may output the second control signal to the secondary shut-off device by power line communication in response to receiving the first control signal from the inverter. In this case, no separate line is required for communication between the primary shut-off device and the secondary shut-off device.

The primary shut-off device may output the second control signal to the secondary shut-off device by wireless communication in response to receiving the first control signal from the inverter. In this case, no communication line is required between the primary shut-off device and the secondary shut-off device.

According to the present invention, the operational stability of the solar power generation system can be improved.

BRIEF DESCRIPTION OF THE DRAWINGS

FIG. 5 is a diagram showing a state of the primary shut-off device in each operation mode.

FIG. 6 is a diagram showing a state of the secondary shut-off device in each operation mode.

DETAILED DESCRIPTION

Figure 1:
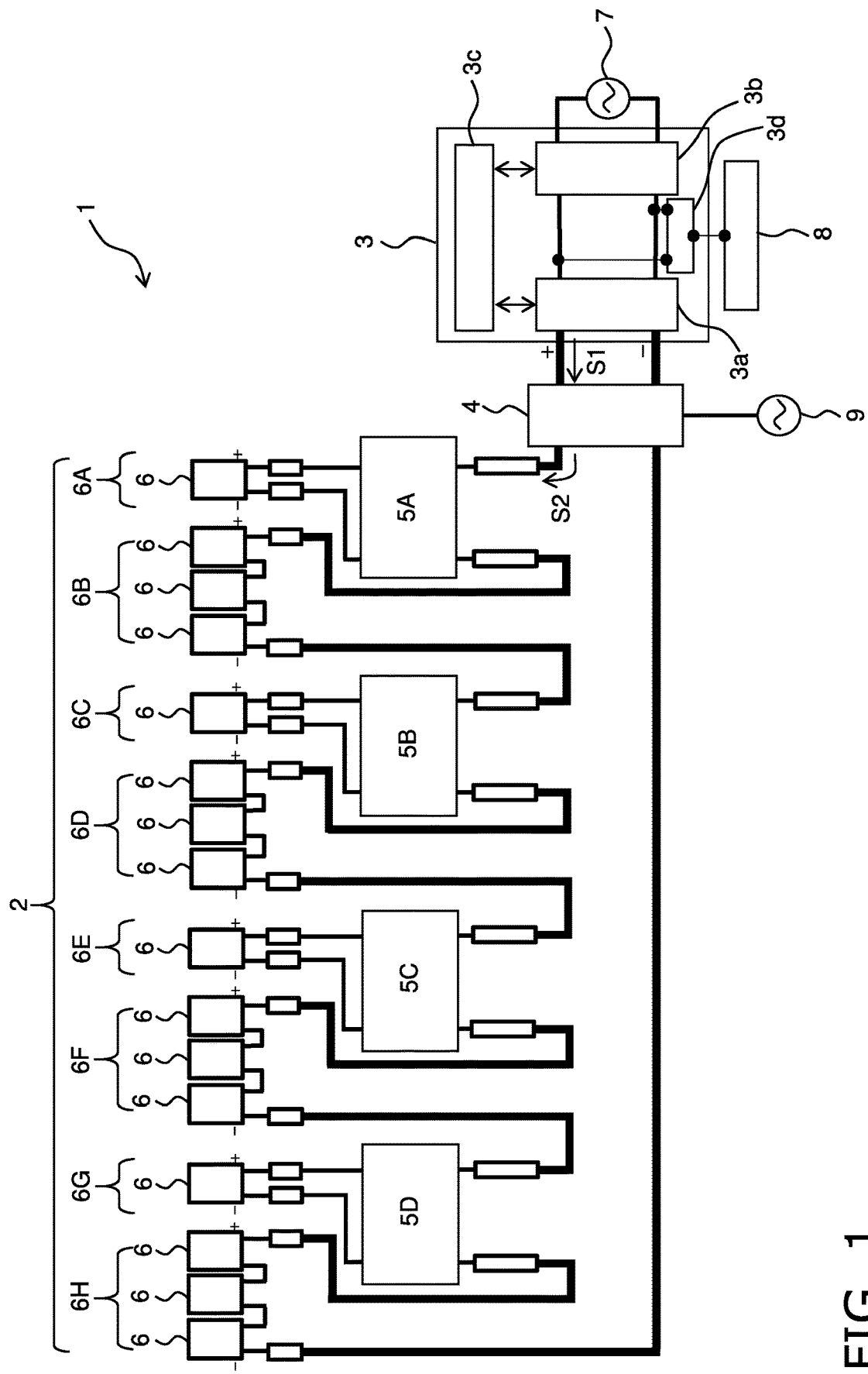
FIG. 1 is a diagram showing a configuration of a solar power generation system.

The solar power generation system 1 will be described with reference to FIG. 1. FIG. 1 is a diagram showing a configuration of the solar power generation system 1. The solar power generation system 1 includes a string 2 of solar modules, an inverter 3, a primary shut-off device 4, and secondary shut-off devices 5A to 5D.

The string 2 includes a plurality of solar cell modules 6 connected in series. The string 2 in the present embodiment includes 16 solar cell modules 6. The solar power generation system 1 may include a solar cell array in which a plurality of strings 2 are connected in parallel.

The solar modules 6 that form the string 2 are grouped into a plurality of solar cell module groups. Each of the solar cell module groups includes one or more solar cell modules 6 in series (where a group containing a single solar cell module 6 is a single-element "group"). Each of the solar cell module groups has an anode-side terminal and a cathode-side terminal. In groups including a single solar cell module 6, the anode of the single solar cell module 6 is the anode-side terminal of the group, while the cathode of the single solar cell module 6 is the cathode-side terminal of the group.

In a group including a plurality of solar cell modules 6, the anode of the solar cell module 6 closest to the anode of the inverter 3, among the plurality of solar cell modules 6 connected in series in the group, is the anode-side terminal of the group, while the cathode of the solar cell module 6 closest to the cathode of the inverter 3 is the cathode-side terminal of the group. In FIG. 1, the anode-side terminal of each solar cell module group is represented by "+", and the cathode-side terminal is represented by "−".

The string 2 includes eight solar cell module groups in total, comprised of the first group 6A to the eighth group 6H. Each of the first group 6A, the third group 6C, the fifth group 6E, and the seventh group 6G includes one solar cell module 6. In contrast, each of the second group 6B, the fourth group 6D, the sixth group 6F, and the eighth group 6H includes three solar cell modules 6.

The first solar cell module group 6A to the eighth solar cell module group 6H are connected in series within the string 2. Specifically, the cathode-side terminal of the first group 6A is connected to the anode-side terminal of the second group 6B. The cathode-side terminal of the second group 6B is connected to the anode-side terminal of the third group 6C. The cathode-side terminal of the third group 6C is connected to the anode-side terminal of the fourth group 6D. The cathode-side terminal of the fourth group 6D is connected to the anode-side terminal of the fifth group 6E. The cathode-side terminal of the fifth group 6E is connected to the anode-side terminal of the sixth group 6F. The cathode-side terminal of the sixth group 6F is connected to the anode-side terminal of the seventh group 6G. The cathode-side terminal of the seventh group 6G is connected to the anode-side terminal of the eighth group 6H. Note that the anode-side terminal of the first group 6A is connected to the anode-side terminal of the inverter 3. The cathode-side terminal of the eighth group 6H is connected to the cathode-side terminal of the inverter 3.

The solar cell modules 6 receive sunlight to generate power. Each of the solar cell modules 6 has an open-circuit voltage of, for example, 50V. The inverter 3 is connected to the string 2 via a power line. The inverter 3 converts the DC power output from the string 2 into AC power, with the string 2 being connected to the plurality of solar cell modules 6 in series. The inverter 3 is connected to a power system 7 and supplies the AC power to the commercial power system and load devices.

Specifically, the inverter 3 includes a DC/DC converter 3a, a DC/AC inverter 3b, a control unit 3c, and a first control signal-generation unit 3d. The DC/DC converter 3a converts the voltage of the power output from the string 2 into a predetermined voltage and inputs it to the DC/AC inverter 3b. The DC/AC inverter 3b converts the DC power output from the DC/DC converter 3a into AC power.

The control unit 3c is a computer system including, for example, a CPU, a storage device, and various interfaces. The control unit 3c controls the DC/DC converter 3a and the DC/AC inverter 3b. The control unit 3c may control the DC/DC converter 3a and the DC/AC inverter 3b by a program stored in the storage device. The first control signal-generation unit 3d outputs a first control signal S1 to the primary shut-off device 4 by power line communication when the operation switch 8 is pressed.

The first shut-off device 4, which may be designated as the primary shut-off device 4 because it is the shut-off device that is closest to the anode of the inverter 3, is connected to a power line connecting the string 2 and the inverter 3. The primary shut-off device 4 cuts off (i.e., disconnects) the string 2 and the inverter 3 in response to the first control signal S1 from the inverter 3.

The shut-off devices 5A to 5D—all of which may be designated as secondary shut-off devices because they are located "downstream" or farther from the anode of the inverter 3 than the primary shut-off device 4 is—are connected to an electric path connecting one solar cell module group to another solar cell module, or to an electric path connecting a solar cell module group and the inverter 3.

Specifically, the secondary shut-off device 5A is connected to an electric path connecting the anode-side terminal of the first group 6A and the primary shut-off device 4, but it is also connected to an electric path connecting the cathode-side terminal of the first group 6A and the anode-side terminal of the second group 6B. The secondary shut-off device 5B is connected to an electric path connecting the anode-side terminal of the third group 6C and the cathode-side terminal of the second group 6B, and it is also connected to an electric path connecting the cathode-side terminal of the third group 6C and the anode-side terminal of the fourth group 6D. The secondary shut-off device 5C is connected to an electric path connecting the anode-side terminal of the fifth group 6E and the cathode-side terminal of the fourth group 6D, and is also connected to an electric path connecting the cathode-side terminal of the fifth group 6E and the anode-side terminal of the sixth group 6F. The secondary shut-off device 5D is connected to an electric path connecting the anode-side terminal of the seventh group 6G and the cathode-side terminal of the sixth group 6F, and is also connected to an electric path connecting the cathode-side terminal of the seventh group 6G and the anode-side terminal of the eighth group 6H.

The secondary shut-off devices 5A to 5D, individually in response to a second control signal S2 output from the primary shut-off device 4, cut off the solar cell module groups to which they are individually connected and the other solar cell modules, or they cut off the solar cell module groups to which they are individually connected and the inverter 3.

Figure 2:
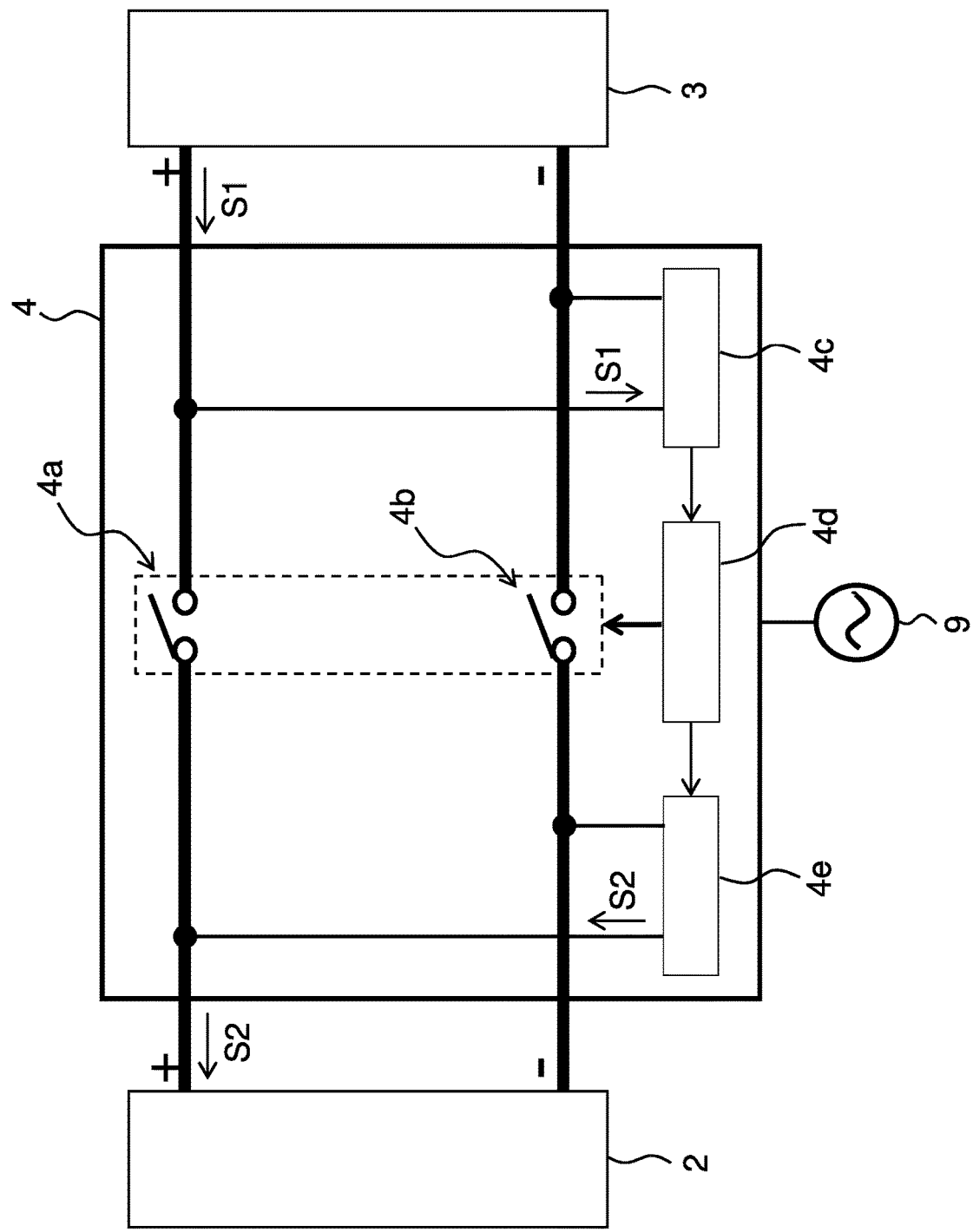
FIG. 2 is a diagram showing a configuration of a primary shut-off device.

Hereinafter, a specific configuration of the primary shut-off device 4 will be described with reference to FIG. 2. FIG. 2 is a diagram showing a configuration of the primary shut-off device 4. The primary shut-off device 4 includes a first open-close unit 4a (a first primary-device open-close unit), a second open-close unit 4b (a second primary-device open-close unit), a first signal-receiving unit 4c, a first driving unit 4d, and a first signal-transmission unit 4e.

The first open-close unit 4a is connected at one end to the anode-side terminal of the inverter 3 and is connected at the other end to the anode-side terminal of the string 2. The second open-close unit 4b is connected at one end to the cathode-side terminal of the string 2 and is connected at the other end to the cathode-side terminal of the inverter 3. The "cathode-side terminal of the string 2" is the cathode of the solar cell module 6 closest to the cathode of the inverter 3 among the solar cell modules 6 in the eighth group 6H. The first open-close unit 4a and the second open-close unit 4b are, for example, switching devices that cut off/connect the electric paths connected to the open-close units by opening and closing the contacts. The first open-close unit 4a and the second open-close unit 4b may, for example, be relays.

In the present embodiment, the first open-close unit 4a and the second open-close unit 4b open or close (that is, have the ON state and the OFF state switched) simultaneously under the control of the first drive unit 4d. With this configuration, it is possible to simultaneously cut off the power line connecting the anode-side terminal of the string 2 and the anode-side terminal of the inverter 3 and the power line connecting the cathode-side terminal of the string 2 and the cathode-side terminal of the inverter 3.

Alternatively, the first open-close unit 4a and the second open-close unit 4b may be openable and closable independently of each other by receiving independently the drive signal from the first drive unit 4d. With this configuration, the number of combinations can be increased for cutting off 1) the power line connecting the anode-side terminal of the string 2 and the anode-side terminal of the inverter 3 and 2) the power line connecting the cathode-side terminal of the string 2 and the cathode-side terminal of the inverter 3. For example, both of the above two power lines can be cut off, and also only one of the two power lines can be cut off. With this configuration, even if one of the open-close units fails to operate properly, the other open-close unit cuts off one power line to ensure the cutting-off of the string 2 and the inverter 3.

The first signal-receiving unit 4c receives the first control signal S1 output from the inverter 3. Upon receiving the first control signal S1, the first signal-receiving unit 4c outputs to the first driving unit 4d a signal indicating that the first control signal S1 has been received. In the present embodiment, the first control signal S1 is output to the power line connecting the inverter 3 and the primary shut-off device 4 by power line communication. Thus, the first signal-receiving unit 4c is, for example, a signal-receiving circuit configured to extract a signal by power line communication from the power line.

The first drive unit 4d outputs a drive signal to drive the first open-close unit 4a and the second open-close unit 4b to the first open-close unit 4a and the second open-close unit 4b. When the string 2 and the inverter 3 are connected, the first drive unit 4d outputs a drive signal for closing the first open-close unit 4a and the second open-close unit 4b (ON state) to these open-close units. Upon receiving a signal indicating that the first control signal S1 has been received from the first signal-receiving unit 4c, the first driving unit 4d stops outputting the driving signal, and brings the first open-close unit 4a and the second open-close unit 4b into the open state (OFF state). With this configuration, the first open-close unit 4a and the second open-close unit 4b are able to cut off the string 2 and the inverter 3 in response to the first control signal S1.

Contrary to the above configuration, the first open-close unit 4a and the second open-close unit 4b may be configured to enter the open state upon receiving the drive signal from the first drive unit 4d. In this case, the first drive unit 4d outputs a drive signal upon receiving a signal indicating that the first control signal S1 has been received from the first signal reception unit 4c, and brings the first open-close unit 4a and the second open-close unit 4b into the open state. While receiving no signal indicating that the first control signal S1 has been received, the first drive unit 4d stops outputting the driving signal, to close the first open-close unit 4a and the second open-close unit 4b.

The first drive unit 4d is, for example, a signal-generation circuit that generates a signal to drive the first open-close unit 4a and the second open-close unit 4b upon receiving a signal from the first signal reception unit 4c.

When the string 2 and the inverter 3 are cut off in response to the first control signal S1, the first drive unit 4d outputs to the first signal-transmission unit 4e a signal indicating that the string 2 and the inverter 3 are cut off. Upon receiving the signal indicating that the string 2 and the inverter 3 are cut off, the first signal-transmission unit 4e outputs the second control signal S2 to the power line connecting the primary shut-off device 4 and the string 2. In the present embodiment, the first signal-transmission unit 4e outputs the second control signal S2 to the power line connecting the primary shut-off device 4 and the string 2 by power line communication. Thus, the first signal-transmission unit 4e is, for example, a signal-generation circuit configured to generate and output a signal to be transmitted by power line communication.

The primary shut-off device 4 is driven by an external commercial power supply 9. Specifically, the first drive unit 4d uses AC power supplied from the commercial power supply 9 to generate a drive signal to drive the first open-close unit 4a and the second open-close unit 4b. For example, AC power from commercial power supply 9 can be converted into DC power to generate drive power. Further, the first signal-receiving unit 4c and the first signal-transmission unit 4e are also driven by the AC power supplied from the commercial power supply 9. With this configuration, the primary shut-off device 4 is operable regardless of whether or not power is supplied from the string 2.

Figure 3:
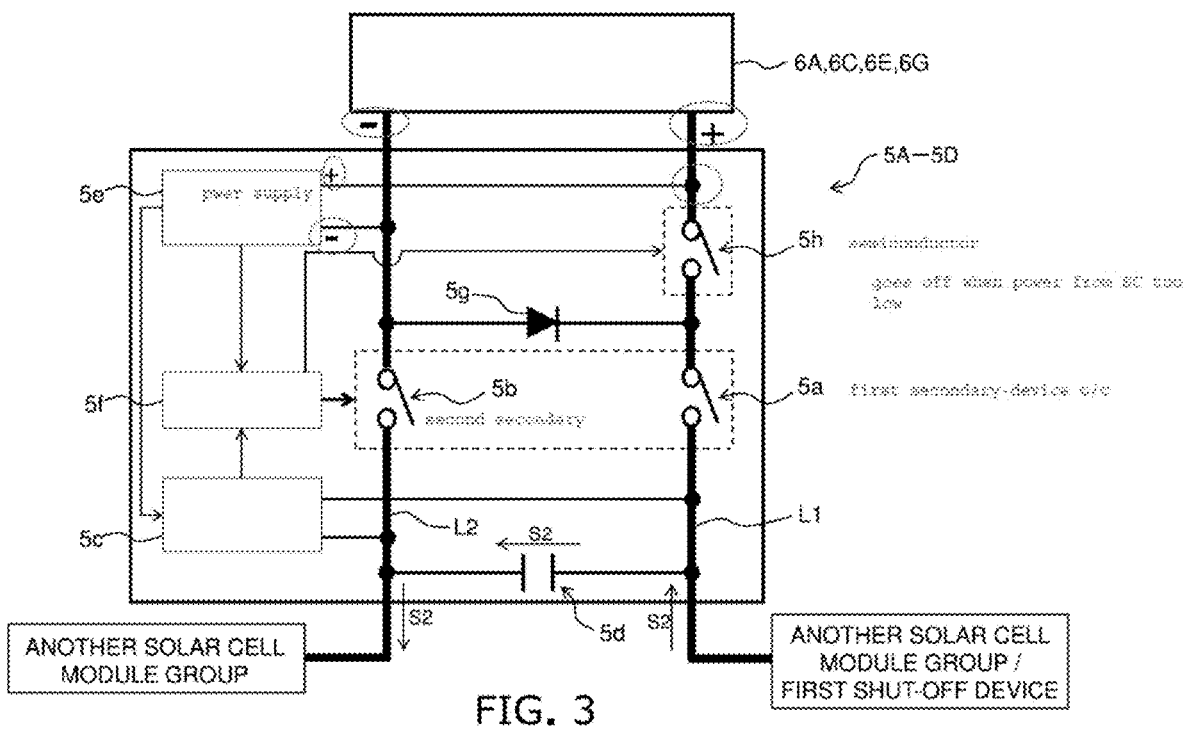
FIG. 3 is a diagram showing a configuration of a secondary shut-off device.

Hereinafter, a specific configuration of the secondary shut-off devices 5A to 5D will be described with reference to FIG. 3. FIG. 3 is a diagram showing a configuration of the secondary shut-off devices 5A to 5D. The secondary shut-off devices 5A to 5D have the same configuration. Thus, in the following description, the configuration of the secondary shut-off device 5A will be described as an example. The secondary shut-off device 5A includes a third open-close unit 5a (a first secondary-device open-close unit), a fourth open-close unit 5b (a second secondary-device open-close unit), a second signal-receiving unit 5c, a bypass circuit 5d, a power supply unit 5e, a second drive unit 5f, a bypass device 5g, and a semiconductor switching device 5h.

The third open-close unit 5a is disposed in a first electric pathway L1 that extends through the secondary shut-off unit 5A and that connects the anode-side terminal of a solar cell module group and another solar cell module group or the inverter 3. Specifically, in the first electric pathway L1, the third open-close unit 5a is connected at one end to the primary shut-off device 4 and is connected at the other end to the semiconductor switching device 5h. In the secondary shut-off devices other than the secondary shut-off device 5A, the third open-close unit 5a is connected at one end to another solar cell module group adjacent to the solar cell module group to which the secondary shut-off device is connected, rather than to the primary shut-off device 4. The third open-close unit 5a is, for example, a switching device configured to cut off/connect the electric path connected to the open-close unit by opening and closing the contact. The third open-close unit 5a is, for example, a relay.

The fourth open-close unit 5b is disposed in a second electric pathway L2 that extends through the secondary shut-off unit and that connects the cathode-side terminal of a solar cell module group and another solar cell module group or the inverter 3. Specifically, in the second electric pathway L2, the fourth open-close unit 5b is connected at one end to the cathode-side terminal of the first group A and is connected, at the other end to the anode-side terminal of the second group 6B. The fourth open-close unit 5b is, for example, a switching device configured to cut off/connect the electric path connected to the open-close unit by opening and closing the contact. The fourth open-close unit 5b is, for example, a relay.

In the present embodiment, the third open-close unit 5a and the fourth open-close unit are openable and closable simultaneously by the control of the second drive unit 5E With this configuration, the secondary shut-off device 5A is able to simultaneously cut off the electric path connecting the anode-side terminal of the first group 6A and the primary shut-off device 4 and the electric path connecting the cathode-side terminal of the first group 6A and the anode-side terminal of the second group 6B.

Alternatively, the third open-close unit 5a and the fourth open-close unit 5b may be independently openable and closable by receiving independently the drive signal from the second drive unit 5f. With this configuration, the secondary shut-off device 5A can increase the number of combinations for cutting off 1) the electric path connecting the anode-side terminal of the first group 6A and the primary shut-off device 4 and 2) the electric path connecting the cathode-side terminal of the first group 6A and the anode-side terminal of the second group 6B. For example, both of the above two electric paths can be cut off, and also only one of the two electric paths can be cut off. As a result, even if one of the open-close units fails to operate properly, the other open-close unit cuts off one electric path so as to cut off the first group 6A and the other devices.

The second signal-receiving unit 5c receives the second control signal S2 output from the primary shut-off device 4. Upon receiving the second control signal S2, the second signal-receiving unit 5c outputs to the second driving unit 5f a signal indicating that the second control signal S2 has been received. In the present embodiment, the second control signal S2 is output to the electric path connecting the primary shut-off device 4 and the secondary shut-off device 5A by power line communication. Thus, the second signal-receiving unit 5c is, for example, a signal-receiving circuit configured to extract a signal by power line communication from an electric path.

The bypass circuit 5d is a circuit configured to transmit the second control signal S2 from one electric path of the secondary shut-off device 5A to another electric path. Specifically, the bypass circuit 5d transmits the second control signal S2 that has come through the electric path where the primary shut-off device 4 is connected to the electric path connecting the cathode-side terminal of the first group 6A and the anode-side terminal of the second group 6B.

In the present embodiment, the second control signal S2 is transmitted through the electric path by power line communication. That is, the second control signal S2 is a signal of a predetermined frequency. Thus, the bypass circuit 5d is a circuit configured to pass a signal of a predetermined frequency. Specifically, the bypass circuit 5d is, for example, a high-pass filter circuit configured to pass a signal of a frequency equal to or higher than the predetermined frequency or a band-pass filter circuit configured to pass only a signal of the predetermined frequency. The bypass circuit 5d, which is a high-pass filter, can be formed by a capacitor device, for example.

The power supply unit 5e uses the power generated by the solar cell module in the first group 6A to generate power to drive the secondary shut-off device 5A. When DC power is used as the power to drive the secondary shut-off device 5A, the power supply unit 5e may, for example, be a regulator circuit. The anode-side terminal of the power supply unit 5e (the terminal on the side illustrated by "+" in FIG. 3) is connected between the anode-side terminal of the first group 6A and the semiconductor switching device 5h in the first electric pathway L1. The cathode-side terminal (the terminal on the side illustrated by "–" in FIG. 3) is connected between the anode-side terminal of the first group 6A and the fourth open-close unit 5b in the second electric pathway L2.

The second drive unit 5f outputs a drive signal to the third open-close unit 5a and the fourth open-close unit 5b to drive the third open-close unit 5a and the fourth open-close unit 5b. The second drive unit 5f uses the power supplied from the power supply unit 5e to generate the above drive signal and outputs the drive signal to the third open-close unit 5a and the fourth open-close unit 5b.

In order to connect the solar cell module group where the secondary shut-off device 5A is connected to another device, the second drive unit 5f outputs to these open-close units a drive signal to close the third open-close unit 5a and the fourth open-close unit 5b.

Upon receiving from the second signal-receiving unit 5c a signal indicating that the second control signal S2 has been received, the second driving unit 5f stops the output of the above driving signal and opens the third open-close unit 5a and the fourth open-close unit 5b. With this configuration, the third open-close unit 5a and the fourth open-close unit 5b are able to cut off the solar cell module group and other devices in response to the second control signal S2.

As an alternative to the above configuration, the third open-close unit 5a and the fourth open-close unit 5b may enter the open state upon receiving the drive signal from the second drive unit 5f. In that case, the second drive unit 5f outputs a drive signal upon receiving the signal indicating that the second control signal S2 has been received from the second signal-receiving unit and opens the third open-close unit 5a and the fourth open-close unit 5b. While not receiving the signal indicating that the second control signal S2 has been received, the second drive unit 5f stops the output of the drive signal and closes the third open-close unit 5a and the fourth open-close unit 5b.

The second drive unit 5f is, for example, a signal-generation circuit configured to generate a signal to drive the third open-close unit 5a and the fourth open-close unit 5b by using the power supplied from the power supply unit 5e upon receiving a signal from the second signal reception unit 5c.

The second control signal S2 is output after the primary shut-off device 4 receives the first control signal S1 and cuts off the string 2 and the inverter 3. Thus, the electric path is cut off by the secondary shut-off device 5A after the string 2 and the inverter 3 are cut off.

The bypass device 5g is connected in parallel to the first group 6A where the secondary shut-off device 5A has been connected. The bypass device 5g forms an electric path that bypasses the solar cell module group where the secondary shut-off device 5A has been connected. As shown in FIG. 3, the bypass device 5g is connected at one end between the cathode-side terminal of the first group 6A and the fourth open-close unit 5b in the second electric pathway L2. The other end of the bypass device 5g is connected between the third open-close unit 5a and the semiconductor switching device 5h in the first electric pathway L1. The bypass device 5g is a diode having an anode connected to the second electric pathway L2 and a cathode connected to the first electric pathway L1.

If the solar cell module of the first group 6A is shaded at sunrise or sunset, sometimes sufficient power cannot be output from the first group 6A due to an abnormality such as a sudden power drop or abnormal heat generation in the first group 6A. At that time, the bypass device 5g forms an electric path that supplies the power generated by the other solar cell module group by "bypassing" the first group 6A in which the abnormality has occurred. Specifically, the bypass device 5g of the secondary shut-off device 5A forms a path through which the power generated in the second group 6B to eighth group 6H is supplied from the second group 6B to the inverter 3 (primary shut-off device 4) when an abnormality occurs in the first group 6A.

When the first group 6A cannot output sufficient power, the bypass device 5g, which is a diode, is able to immediately form an electric path that bypasses the first group 6A based on its own electrical characteristics and without any command of an external signal.

Figure 4:
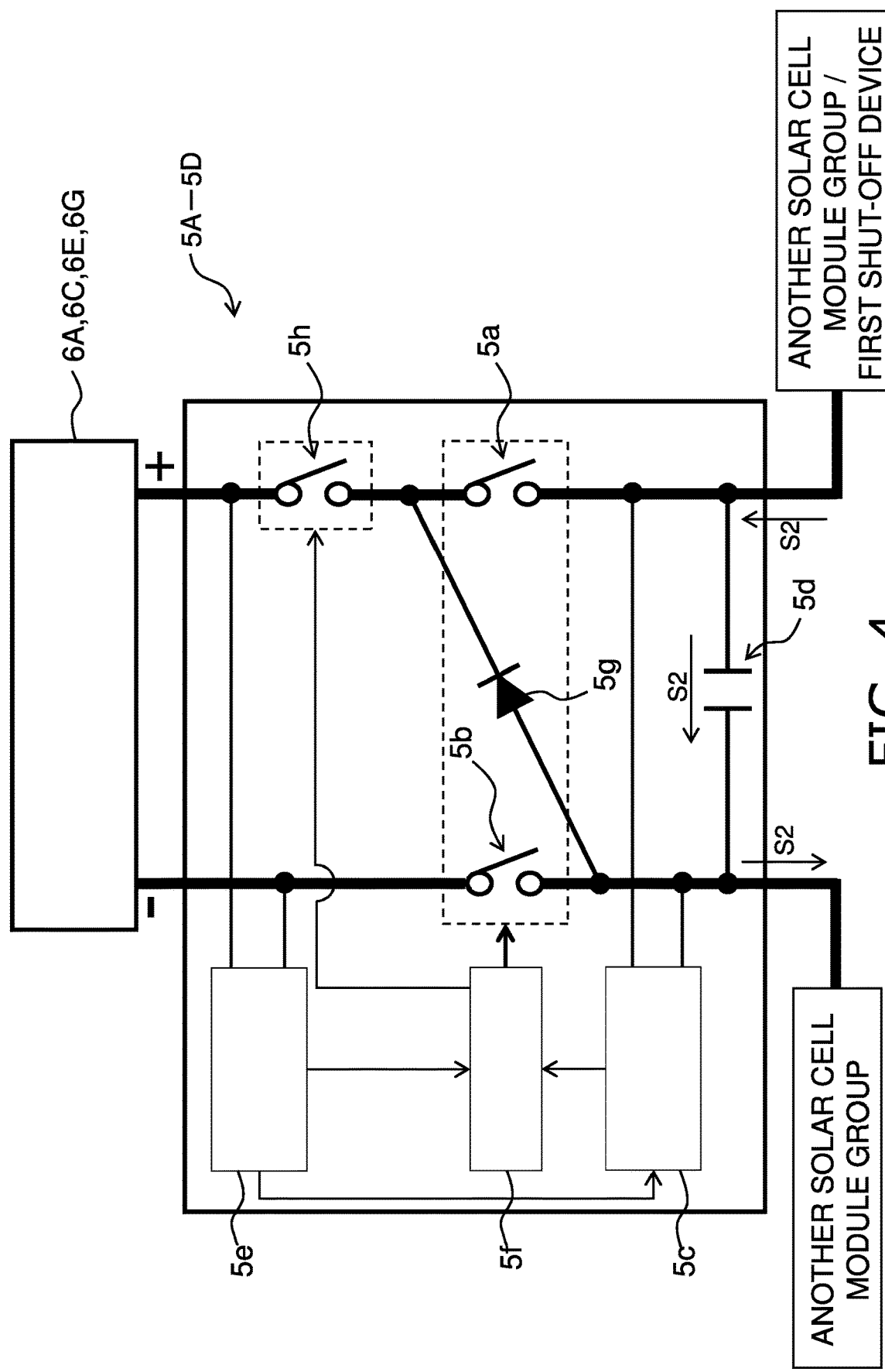
FIG. 4 is a diagram showing another example of connection of a bypass device in the secondary shut-off device.

Note that the connection of the two terminals of the bypass device 5g can be positioned as desired, so long as the first group 6A where the secondary shut-off device 5A is connected is bypassed, and also at least one of the terminals of the bypass device 5g is connected to the first group 6A without connection to the third open-close unit 5a or the fourth open-close unit 5b. For example, as shown in FIG. 4, the anode of the bypass device 5g may be connected between the anode-side terminal of the second group 6B and the fourth open-close unit 5b in the second electric pathway L2, and the cathode may be connected in the first electric path L1, between the anode-side terminal of the first group and the third open-close unit 5a. FIG. 4 is a diagram showing another example of the connection of the bypass device 5g in the secondary shut-off device 5A.

The semiconductor switching device 5h is connected in series with the third open-close unit 5a in the first electric pathway L1. Specifically, the semiconductor switching device 5h is connected, at one end to the anode-side terminal of the first group 6A in the first electric pathway L1. As described above, in the first electric pathway L1, the anode-side terminal of the power supply unit 5e is connected between one end of the semiconductor switching device 5h and the anode-side terminal of the first group 6A. The other end of the semiconductor switching device 5h is connected to the other end of the third open-close unit 5a (i.e., the side opposite to the side connected to the primary shut-off device 4) in the first electric pathway L1. The semiconductor switching device 5h is, for example, a MOSFET device or an Insulated Gate Bipolar Transistor (IGBT) device.

The semiconductor switching device 5h is connected to the second drive unit 5f, and the second drive unit 5f controls switching between the ON state and the OFF state of the semiconductor switching device 5h. The second drive unit 5f determines whether to turn the semiconductor switching device 5h into the ON state or the OFF state based on the amount of power generated by the first group 6A. For that determination, the second drive unit 5f monitors the amount of power generated by the first group 6A. Specifically, the second drive unit 5f turns the semiconductor switching device 5h into the OFF state when the amount of power generated by the first group 6A falls below a predetermined threshold. When the amount of power generated by the first group 6A becomes equal to or above the predetermined threshold, the second drive unit 5f turns the semiconductor switching device 5h into the ON state. The threshold can be, for example, set as an amount of power that enables appropriate opening and closing of the third open-close unit 5a and the fourth open-close unit 5b even when the first group 6A is connected to the electric path connected to the inverter 3.

When the semiconductor switching device 5h is a MOSFET device or an IGBT device, the second drive unit 5f is connected to a gate terminal of the semiconductor switching device 5h. The second drive unit 5f can turn the semiconductor switching device 5h into an ON state or an OFF state by outputting a predetermined voltage signal to the gate terminal. When a voltage signal is output to the gate terminal to turn the MOSFET device or the IGBT device into the ON state or the OFF state, almost no current flows through the gate terminal. As described above, the semiconductor switching device 5h such as a MOSFET device or an IGBT device can reduce the power required to turn the semiconductor switching device 5h into the ON state or the OFF state.

In the secondary shut-off devices 5A to 5D of the above configuration, the semiconductor switching device 5h enters the OFF state when the amount of power generated by the solar cell module group connected to the secondary shut-off device falls below the predetermined threshold. As a result, when the amount of power generated by a solar cell module group is small, the electric path from the solar cell module group to the inverter 3 is cut off so that the solar cell module group is allowed to supply power only to the power supply unit 5e. That is, when the amount of power generated by a solar cell module group is small, the power generated by the solar cell module group is used only to drive the third open-close unit 5a and the fourth open-close unit 5b. As long as the power from the solar cell module group is supplied only to the third open-close unit 5a and the fourth open-close unit 5b, even if the amount of power generated by the solar cell module group is small or unstable, the third open-close unit 5a and the fourth open-close unit 5b can be maintained in the closed state (that is, ON state). As a result, the solar power generation system 1 operates stably.

Further, in the above-mentioned secondary shut-off devices 5A to 5D, even if there occurs an abnormality in the amount of power generated by the solar cell module group, the third open-close unit 5a and the fourth open-close unit 5b can be maintained in the closed state (ON state), and therefore the third open-close unit 5a and the fourth open-close unit 5b are unlikely to open and close while a high voltage is applied to them. Thus, the third open-close unit 5a and the fourth open-close unit 5b are not required to have a large voltage-handling characteristic and can be inexpensive.

Next, an example of the operations of the primary shut-off device 4 and the secondary shut-off devices 5A to 5D will be described with reference to FIGS. 5 and 6. As for the operations of the secondary shut-off device 5A to 5D, the operation of the secondary shut-off device 5A is taken as an example. The other secondary shut-off devices 5B to 5D operate similarly to the secondary shut-off device 5A. FIG. 5 is a diagram showing a state of the primary shut-off device 4 in each operation mode. FIG. 6 is a diagram showing states of the secondary shut-off devices 5A to 5D in each operation mode. The operation modes in the solar power generation system 1 include three of a start mode, an active mode, and a safety mode. The safety mode includes a normal shutoff mode and an emergency safety shutoff mode.

The start mode is a mode that is entered when sunlight starts to hit the solar cell module 6. At this time, the solar cell modules 6 receive sunlight to generate power. In the start mode, the inverter 3 does not output the first control signal S1 (i.e., the first control signal is "NO"), and thereby the first open-close unit 4a and the second open-close unit 4b are closed (i.e., the relay operation mode is "ON") in the primary shut-off device 4, and then the string 2 and the inverter 3 are connected. Since the first control signal S1 is not output, the first signal-transmission unit 4e does not output the second control signal S2.

In the secondary shut-off device 5A, the power supply unit 5e uses the power generated by the first group 6A to generate power to drive the secondary shut-off devices 5A to 5D. Further, since the primary shut-off device 4 does not output the second control signal S2 (i.e., the second control signal is "NO"), the second drive unit 5f generates a drive signal using the power generated by the power supply unit 5e to output it to the third open-close unit 5a and the fourth open-close unit 5b. As a result, the third open-close unit 5a and the fourth open-close unit 5b are turned on (i.e., the relay operation mode is "ON"). As a result, the first group 6A and the primary shut-off device 4 are connected in the first electric pathway L1, and the first group 6A and the second group 6B are connected in the second electric pathway L2. When sufficient power is available from the first group 6A, the semiconductor switching device 5h is in the ON state (i.e., the semiconductor switch operation mode is "ON").

In the start mode in which sunlight begins to hit the solar cell modules 6, the amount of power generated from each solar cell module group is small. Thus, in the start mode (particularly, at the time of shifting from the later-described normal cut-off mode to the start mode, e.g., at sunrise), if the power generated by the first group 6A is used to drive the third open-close unit 5a and the fourth open-close unit 5b and is also to be supplied to the inverter 3, sufficient power might not be provided to drive the third open-close unit 5a and the fourth open-close unit 5b. In that case, even if the third open-close unit 5a and the fourth open-close unit 5b try to shift from the open state (OFF state) to the closed state (ON state), they immediately return to the open state (OFF state), and this try-and-return action may be repeated.

Thus, in the start mode, when sufficient power is not available from the first group 6A (that is, when the amount of power generated by the first group 6A is smaller than a predetermined threshold), the second drive unit 5f turns the semiconductor switching device 5h into an OFF state, and then supplies power to the third open-close unit 5a and the fourth open-close unit 5b to close these open-close units. With this configuration, power from the first group 6A is used only to drive the third open-close unit 5a and the fourth open-close unit 5b so that even if the amount of power generated by the first group 6A is small, the third open-close unit 5a and the fourth open-close unit 5b can be maintained in the closed state (ON state).

When sufficient power is not available from the first group 6A, the power generated by the other solar cell module groups passes through the bypass device 5g to the inverter 3. With this configuration, even if sufficient power is not available from a specific solar cell module group (first group 6A), the solar power generation system 1 is able to continue normal operations without stopping by using the power from the other solar cell module groups.

After that, when sufficient power is available from the first group 6A (that is, when the amount of power generated by the first group 6A becomes equal to or higher than a predetermined threshold), the second drive unit 5f turns the semiconductor switching device 5h ON and connects the electric path from the first group 6A to the inverter 3. As a result, the secondary shut-off device 5A is able to transfer the power from the first group 6A to the inverter 3.

As described above, in the start mode, the power stably generated in the string 2 is supplied to the inverter 3 via the primary shut-off device 4. The DC power supplied from the string 2 is converted into AC power by the inverter 3 and supplied to the power system 7.

The active mode is a state in which the solar cell modules 6 receive sunlight during the day to generate electricity, and it is substantially the same as the start mode. Specifically, in the active mode, no first control signal S1 is output (i.e., the first control signal is "NO"), and the first open-close unit 4a and the second open-close unit 4b of the primary shut-off device 4 are closed (i.e., the relay operation mode is "ON"). Further, no second control signal S2 is output (i.e., the second control signal is "NO"), and the third open-close unit 5a and the fourth open-close unit 5b of the secondary shut-off devices 5A to 5D are in the closed state. In addition, the semiconductor switching device 5h is in the ON state (i.e., the semiconductor switch operation mode is "ON"). As a result, the power generated in the string 2 is supplied to the inverter 3 via the primary shut-off device 4. The DC power supplied from the string 2 is converted into AC power by the inverter 3 and supplied to the power system 7.

In the active mode, when the amount of power generated by the first group 6A decreases and the amount of power generated by the first group 6A falls below a predetermined threshold (for example, when the solar cell module of the first group 6A is shaded), the second drive unit 5f turns the semiconductor switching device 5h into an OFF state. As a result, the third open-close unit 5a and the fourth open-close unit 5b can be maintained in the closed state (ON state) even if sufficient power is not supplied from the solar cell module groups.

The normal cut-off mode is a mode when the solar cell modules 6 are not exposed to sunlight, e.g., at night or due to bad weather such as rain. Accordingly, in the normal cut-off mode, the solar cell modules 6 do not generate electricity. In the normal cut-off mode, the first control signal S1 is output from the inverter 3 (i.e., the first control signal is "YES"). Thus, in the primary shut-off device 4, the first open-close unit 4a and the second open-close unit 4b are in the open state (i.e., the relay operation mode is "OFF"). As a result, in the normal cutoff mode, the string 2 and the inverter 3 are cut off.

In the secondary shut-off device 5A, when the first control signal S1 is output, the first signal-transmission unit 4e outputs the second control signal S2 to the string 2 by power line communication (i.e., the second control signal is "YES"). The semiconductor switching device 5h is then turned off (i.e., the semiconductor switch operation mode is "OFF"). Note that in the normal cutoff mode, no power is supplied to the secondary shut-off device 5A from the first group 6A. Accordingly, the second drive unit 5f cannot generate a drive signal to be output to the third open-close unit 5a and the fourth open-close unit 5b, and the third open-close unit 5a and the fourth open-close unit 5b remain in the open state (i.e., the relay operation mode is "OFF").

The inverter 3 outputs the first control signal S1 at the time of shifting from the start mode or the active mode to the normal cut-off mode. When the first signal-receiving unit 4c receives the first control signal S1, the first driving unit 4d turns off the second semiconductor switching device 4f and then opens the first open-close unit 4a and the second open-close unit 4b. As a result, the string 2 and the inverter 3 are cut off. At the timing when the string 2 and the inverter 3 are cut off, the first signal-transmission unit 4e outputs the second control signal S2 to the string 2 by power line communication.

At the time of shifting from the start mode or the active mode to the normal cut-off mode, e.g., at sunset, the amount of power generated by the first group 6A is small. As such, when shifting to the normal cutoff mode, if the power generated by the first group 6A is used both 1) to drive the third open-close unit 5a and the fourth open-close unit 5b, and 2) to supply the inverter 3, sufficient power might not be provided to drive the third open-close unit 5a and the fourth open-close unit 5b. In that case, even if the third open-close unit 5a and the fourth open-close unit 5b try to shift from the open state (OFF state) to the closed state (ON state), they immediately return to the open state (OFF state), and this try-and-return action may be repeated.

Thus, at the time of shifting to the normal cutoff mode, when sufficient power is not available from the first group 6A (that is, when the amount of power generated by the first group 6A is smaller than a predetermined threshold), the second drive unit 5f turns the semiconductor switching device 5h into an OFF state. With this configuration, even if the amount of power generated by the first group 6A is small, the third open-close unit 5a and the fourth open-close unit 5b can be maintained in the closed state (ON state). After that, at an appropriate timing in the normal cut-off mode, the second drive unit 5f opens the third open-close unit 5a and the fourth open-close unit 5b.

Through the above operations, in the normal cut-off mode, no power is supplied from the string 2 to the inverter 3.

In the normal cut-off mode, for example, when the power generation by the solar cell modules 6 is unstable due to unstable weather or the like, the third open-close unit 5a and the fourth open-close unit 5b are closed or opened (i.e., the relay operation mode is "ON/OFF," respectively) depending on the power supplied from the first group 6A. In this case, the second drive unit 5f turns the semiconductor switching device 5h into an OFF state. With this configuration, even if the power supplied from the first group 6A becomes unstable due to the unstable power generated by the solar cell modules 6, the power from the first group 6A can be used only to drive the third open-close unit 5a and the fourth open-close 5b, i.e., the third open-close unit 5a and the fourth open-close unit 5b can be operated appropriately. Specifically, the third open-close unit 5a and the fourth open-close unit 5b are maintained in the closed state (ON state), and the power generated by the other solar cell module groups is transferred to the inverter 3 via the bypass device 5g.

The emergency safety cut-off mode is a mode in which the power supply from the string 2 to the inverter 3 is cut off during the start mode or the active mode. The emergency safety cut-off mode starts upon operation of the operation switch 8 in the start mode or the active mode.

Specifically, when the operation switch 8 is operated, the first control signal-generation unit 3d of the inverter 3 transmits a first control signal S1 to the primary shut-off device 4 by power line communication (i.e., the first control signal is "YES"). When the first signal-receiving unit 4c receives the first control signal S1, the first driving unit 4d stops the output of drive power to the first open-close unit 4a and the second open-close unit 4b. As a result, the string 2 and the inverter 3 are cut off (i.e., the relay operation mode is "OFF"). When the string 2 and the inverter 3 are cut off, the first signal-transmission unit 4e outputs a second control signal S2 to the string 2 by power line communication (i.e., the second control signal is "YES").

When the second signal-receiving unit 5c of the secondary shut-off device 5A receives the second control signal S2, the second driving unit 5f turns the semiconductor switching device 5h into an OFF state (i.e., the semiconductor switch operation mode is "OFF"), and then stops the output of the drive power to the third open-close unit 5a and the fourth open-close unit 5b. As a result, the first group 6A and the second group 6B are cut off, and the first group 6A and the inverter 3 are cut off (i.e., the relay operation mode is "OFF"). That is, the voltage output from all the solar cell modules 6 in the string 2 is cut off.

As described above, in the emergency safety shut-off mode, the string 2 and the inverter 3 can be cut off by the primary shut-off device 4, and the solar cell module groups in the string 2 are individually cut off by the secondary shut-off devices 5A to 5D. Specifically, the secondary shut-off device 5A is able to cut off the connection between the first group 6A and the second group 6B. The secondary shut-off device 5B is able to cut off the connection between the second group 6B and the third group 6C and the connection between the third group 6C and the fourth group 6D. The secondary shut-off device 5C is able to cut off the connection between the fourth group 6D and the fifth group 6E and the connection between the fifth group 6E and the sixth group 6F. The secondary shut-off device 5D is able to cut off the connection between the sixth group 6F and the seventh group 6G and the connection between the seventh group 6G and the eighth group 6H.

Thus, the solar power generation system 1 leads to a lower installation cost of the shut-off devices as compared with the case where a shut-off device is provided individually for each solar cell module 6. Further, in the emergency safety cut-off mode, not only the string 2 is cut off in the unit of solar cell module groups, but also the connection between the string 2 and the inverter 3 is cut off, which provides higher safety to the solar power generation system.

In the solar power generation system 1, the secondary shut-off devices 5A to 5D have a semiconductor switching device 5h, and the semiconductor switching device 5h is turned into the OFF state when the amount of power generated by a solar cell module group connected to the secondary shut-off devices 5A to 5D falls below a predetermined threshold. With this configuration, when the amount of power generated by a solar cell module group is small, the electric path from the solar cell module group to the inverter is cut off, and the solar cell module group is allowed to supply power only to the power supply unit 5e. That is, when the amount of power generated by a solar cell module group is small, the power generated by the solar cell module group is used only to drive the third open-close unit 5a and the fourth open-close unit 5b. When the power from a solar cell module group is supplied only to the third open-close unit 5a and the fourth open-close unit 5b, even if the amount of power generated by the solar cell module group is small or unstable, the third open-close unit 5a and the fourth open-close unit 5b can be maintained in the closed state (ON state). As a result, the solar power generation system 1 is able to operate stably.

One embodiment of the present invention has been described above, but the present invention is not limited to the above embodiment, and various modifications can be made without departing from the scope of the claimed invention.

The grouping of the solar cell module groups in the string 2 and the number of the solar cell modules 6 in each group are determined as desired, for example, based on the open-circuit voltage at which the string 2 is cut off in the emergency safety cutoff mode. For example, in the emergency safety cut-off mode, preferably the open-circuit voltage of the string 2 is divided into 165 V or less. When one solar cell module 6 has an open-circuit voltage of 50 V, the string 2 is preferably cut off in the unit of groups including three solar cell modules 6.

Figure 7:
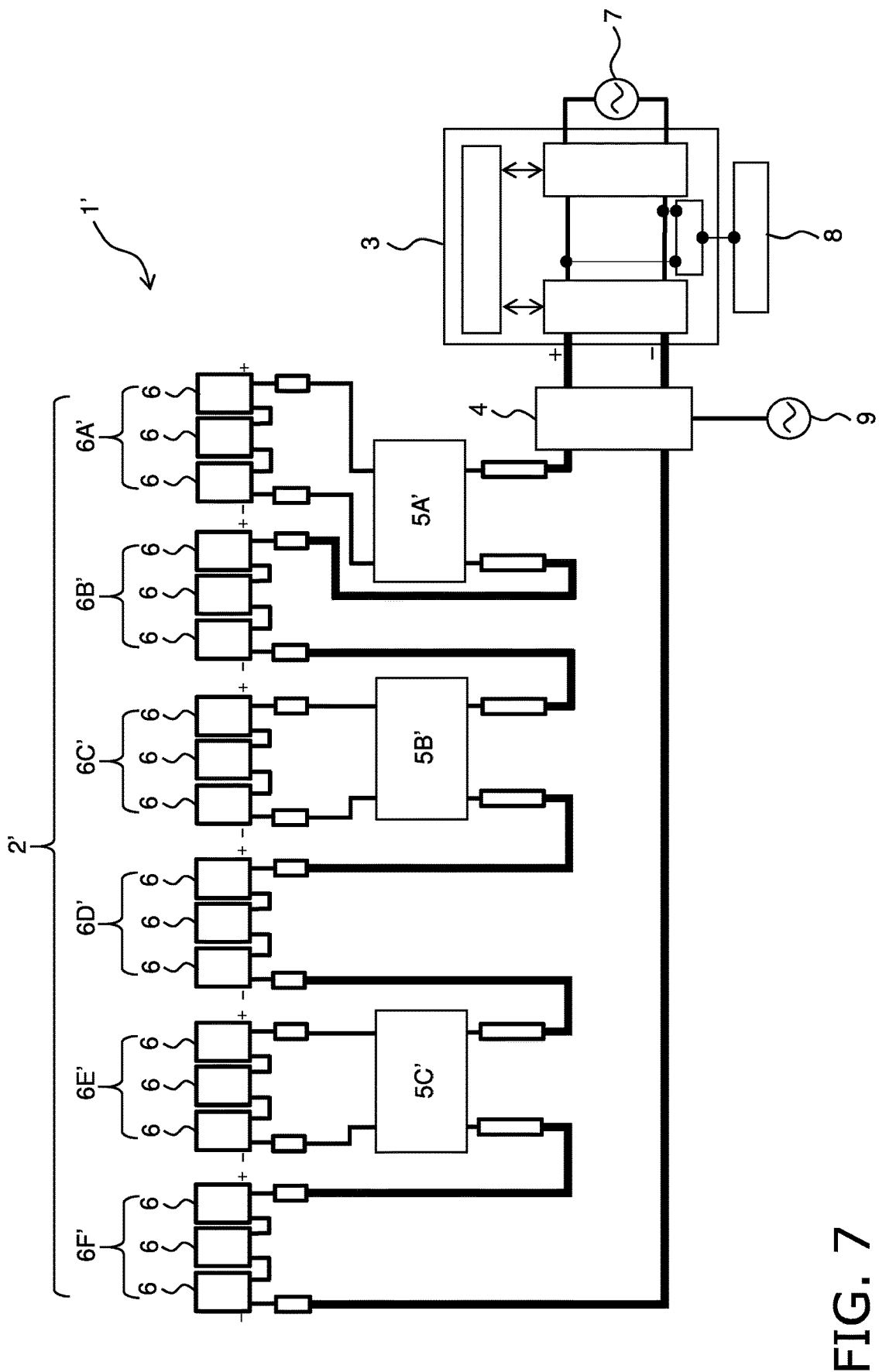
FIG. 7 is a diagram showing another configuration of the solar cell module group in the string.

For example, in the solar power generation system 1' shown in FIG. 7, the string 2' includes 18 solar cell modules 6 connected in series, and includes six solar cell module groups 6A' to 6F'. The solar cell module groups 6A' to 6F' are each composed of three solar cell modules 6 connected in series. Further, the secondary shut-off devices 5A', 5B', and 5C' are connected to the solar cell module groups 6A', 6C', and 6E', respectively. FIG. 7 is a diagram showing another example of the configuration of the solar cell module groups in the string.

Figure 8:
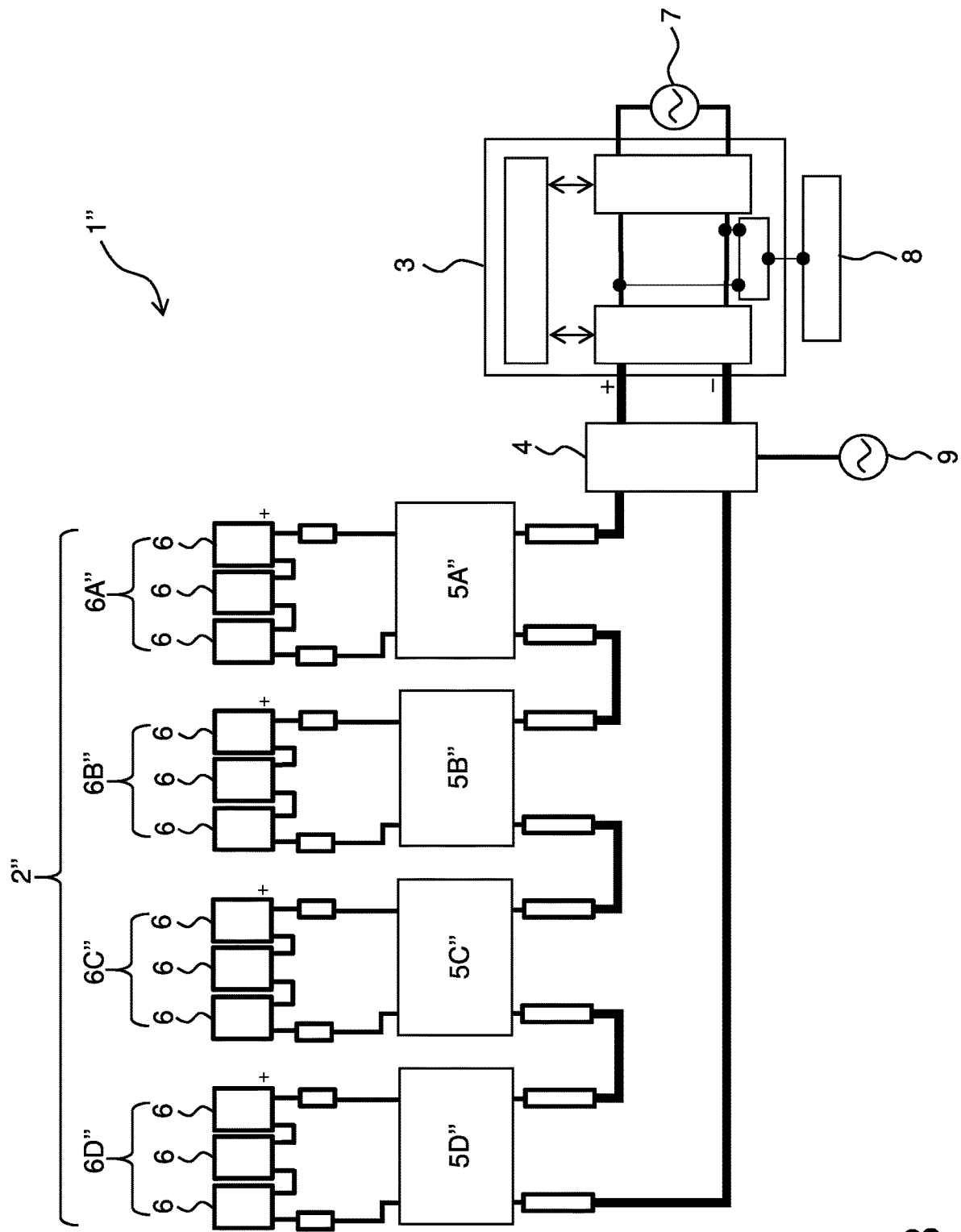
FIG. 8 is a diagram showing another configuration of the solar cell module group in the string.

For example, in the solar power generation system 1″ shown in FIG. 8, the string 2″ includes 12 solar cell modules 6 connected in series, and includes four solar cell module groups 6A″ to 6D″. The solar cell module group 6A″ to 6D″ are each composed of three solar cell modules 6 connected in series. Further, the secondary shut-off devices 5A″ to 5D″ are connected to the solar cell module groups 6A″ to 6D″, respectively. FIG. 8 is a diagram showing another example of the configuration of the solar cell module group in the string.

In the solar power generation system 1″, 1″, only the configurations of the solar cell module groups in the string 2′, 2″ are different from those in the above-mentioned solar power generation system 1, and the other configurations in the solar power generation system 1′, 1″ are the same as those of the solar power generation system 1.

The start mode or the active mode may be switched to the emergency safety cut-off mode when an abnormality is detected from an output state of the solar cell modules 6 in the string 2. In this case, for example, a sensor to detect the output state of the solar cell modules 6 may be mounted in the solar power generation system 1, and when an abnormality is detected from an output state of the solar cell modules 6 detected by the sensor, the control signal-generation unit 3d of the inverter 3 outputs a first control signal S1 to enable switching into the emergency safety cut-off mode. Alternatively, for example, a fire-detection unit or fire alarm may be connected to the inverter 3 so that, when the inverter 3 receives a signal from the fire-detection unit or fire alarm, the first control signal-generation unit 3d outputs a first control signal S1 to enable switching into the emergency safety cut-off mode.

The first control signal S1 and/or the second control signal S2 can be transmitted and received by a method other than power line communication. For example, the first control signal S1 and/or the second control signal S2 may be transmitted and received by wireless communication. Further, the first control signal S1 may be transmitted and received by power line communication, while the second control signal S2 may be transmitted and received by wireless communication. When the second control signal S2 is transmitted and received by wireless communication, the bypass circuit 5d is not required to be disposed in the secondary shut-off device.

The first control signal S1 and/or the second control signal S2 may carry a plurality of types of information. That is, in addition to the configuration where the presence or absence of the first control signal S1 and the second control signal S2 is used to determine whether or not to switch to the emergency safety shut-off mode, a configuration is possible in which the type of information carried or transmitted by the first control signal S1 and/or the second control signal S2 is used to determine whether or not to switch to the emergency safety shut-off mode.

For example, the first control signal S1 and the second control signal S2 may be capable of expressing two types of values (referred to as a first value and a second value) in binary numbers. In this case, for example, the current mode can be determined to be switched to the emergency safety cut-off mode (i.e., the string 2 and the inverter 3 are cut off, and/or the solar cell module groups in the string 2 are cut off) when the first control signal S1 and the second control signal S2 show a first value, while the current mode can be determined not to be switched to the emergency safety cut-off mode (i.e., the string 2 and the inverter 3 remain connected, and/or the solar cell module groups in the string 2 remain connected) when the first control signal S1 and the second control signal S2 show a second value.

In the primary shut-off device 4, the second open-close unit 4b may be omitted. Further, in the secondary shut-off devices, the fourth open-close unit 5b may be omitted.

In the primary shut-off device 4, a semiconductor switching device may be connected in series to the second open-close unit 4b. Further, in the secondary shut-off devices, a semiconductor switching device may be connected in series to the fourth open-close unit 5b.

The first control signal S1 and the second control signal S2 may be output all the time in any mode except the emergency safety shut-off mode, and the output of the first control signal S1 and the second control signal S2 may be stopped in the emergency safety shut-off mode. In this case, the primary shut-off device and the secondary shut-off devices close the open-close units upon receiving the first control signal S1 and the second control signal S2, and keep the open-close units in an open state while the first control signal S1 and the second control signal S2 are not received.

A semiconductor switching device may be mounted also in the primary shut-off device 4. Specifically, for example, a semiconductor switching device may be arranged in series with the first open-close unit 4a in the electric path connecting the anode-side terminal of the string 2 and the anode-side terminal of the inverter 3. In that case, the semiconductor switching device would be turned off before the first open-close unit 4a and the second open-close unit 4b are opened and closed. With this configuration, in the primary shut-off device 4, generation of noise components, chattering, can be reduced during the opening/closing operation of the first open-close unit 4a and the second open-close unit.

The present invention is widely applicable to solar power generation systems having a rapid shutdown function.

1, 1′, 1″ Solar power generation system
2, 2′, 2″ String
3 Inverter
3a DC/DC converter
3b DC/AC inverter
3c Control unit
3d First control signal-generation unit
4 Primary shut-off device
4a First open-close unit
4b Second open-close unit
4c First signal-receiving unit
4d First drive unit
4e First signal-transmission unit
5A-5D Secondary shut-off devices
5A′-5C′ Secondary shut-off devices
5A″-5D″ Secondary shut-off devices
5a Third open-close unit
5b Fourth open-close unit
5c Second signal-receiving unit
5d Bypass circuit
5e Power supply unit
5f Second drive unit
5g Bypass device
5h First semiconductor switching device
6 Solar cell module
6A to 6H Solar cell module groups
6A′ to 6F′ Solar cell module groups
6A″ to 6D″ Solar cell module groups
7 Power system
8 Operation switch
9 Commercial power supply
S1 First control signal
S2 Second control signal

The invention claimed is:

1. A solar power generation system, comprising:
a string including a plurality of solar cell modules connected in series;
an inverter connected to the string and configured to convert DC power output from the string to AC power;
a primary shut-off device disposed between the string and the inverter and configured to cut off the string and the inverter in response to a first control signal received from the inverter; and
a secondary shut-off device connected to an electric path that connects an associated solar cell module group comprised of one or more of the solar cell modules in the string and either A) a first other solar cell module group in the string or B) the inverter, the secondary shut-off device being configured to cut off the associated solar cell module group and either A) said first other solar cell module group in the string or B) the inverter in response to a second control signal received from the primary shut-off device,
the secondary shut-off device including
a first secondary-device open-close unit disposed in a first electric pathway that extends through the secondary shut-off device and that connects either A) an anode-side terminal of the associated solar cell module group and said first other solar cell module group or B) the inverter;
a semiconductor switching device disposed between the first secondary-device open-close unit in the first electric pathway and the anode-side terminal of the associated solar cell module group; and
a power supply unit configured to generate power to drive the first secondary-device open-close unit, the power supply unit having an anode-side terminal connected between the anode-side terminal of the associated solar cell module group in the first electric pathway and the semiconductor switching device, and a cathode-side terminal connected to a cathode-side terminal of the associated solar cell module group,
the semiconductor switching device configured to enter an OFF state when an amount of power generated by the associated solar cell module group falls below a predetermined threshold.

2. The solar power generation system according to claim 1, wherein the secondary shut-off device includes a bypass device connected at one end to a second electric pathway that extends through the secondary shut-off device and, at another end, between the first secondary-device open-close unit in the first electric pathway and the semiconductor switching device, wherein the second electric pathway connects the cathode-side terminal of the associated solar cell module group and either A) a second other solar cell module group or B) the inverter.

3. The solar power generation system according to claim 1, wherein the semiconductor switching device is a MOSFET device or an IGBT device.

4. The solar power generation system according to claim 1, wherein the secondary shut-off device includes a second secondary-device open-close unit that is connected to the second electric pathway connecting the cathode-side terminal of the associated solar cell module group and either A) the second other solar cell module group or B) the inverter.

5. The solar power generation system according to claim 4, wherein the first secondary-device open-close unit and the second secondary-device open-close unit are openable and closable simultaneously.

6. The solar power generation system according to claim 4, wherein the first secondary-device open-close unit and the second secondary-device open-close unit are openable and closable independently of each other.

7. The solar power generation system according to claim 1, wherein the primary shut-off device includes a first primary-device open-close unit connected to an anode-side terminal of the string and an anode-side terminal of the inverter.

8. The solar power generation system according to claim 7, wherein the primary shut-off device includes a second primary-device open-close unit connected to a cathode-side terminal of the string and a cathode-side terminal of the inverter.

9. The solar power generation system according to claim 8, wherein the first primary-device open-close unit and the second primary-device open-close unit are openable and closable simultaneously.

10. The solar power generation system according to claim 8, wherein the first primary-device open-close unit and the second primary-device open-close unit are openable and closable independently of each other.

11. The solar power generation system according to claim 1, wherein the primary shut-off device is driven by power that is supplied from commercial power supply.

12. The solar power generation system according to claim 1, wherein the inverter outputs the first control signal to the primary shut-off device by power line communication.

13. The solar power generation system according to claim 1, wherein the inverter outputs the first control signal to the primary shut-off device by wireless communication.

14. The solar power generation system according to claim 1, wherein the primary shut-off device outputs the second control signal to the secondary shut-off device by power line communication in response to receiving the first control signal from the inverter.

15. The solar power generation system according to claim 1, wherein the primary shut-off device outputs the second control signal to the secondary shut-off device by wireless communication in response to receiving the first control signal from the inverter.

* * * * *